Dec. 19, 1933.  H. G. CRAIG  1,940,205

DISPLAY RECEIVER

Filed July 25, 1932

INVENTOR
H. G. CRAIG
By H. G. Cook
ATTORNEY

Patented Dec. 19, 1933

1,940,205

UNITED STATES PATENT OFFICE 1,940,205

DISPLAY RECEIVER

Harvey G. Craig, Webster Groves, Mo., assignor to S. G. Adams Company, St. Louis, Mo., a corporation of Missouri Application July 25, 1932. Serial No. 624,433

7 Claims. (Cl. 40—2.2)

This invention relates generally to display receivers for automobile license and other certificates, and more specifically to a display receiver of this type which is so constructed and arranged that the certificate displayed therein may not be removed by an unauthorized person without the fact of such removal being apparent, the predominant object of the invention being to provide an extremely simple display receiver of this description which is capable of efficiently performing the function for which it is intended.

In many of the States of the United States of America the laws require that, in addition to the usual tags, automobile license certificates must be carried on the licensed vehicle. This requirement is intended to render more difficult the task of disguising a motor vehicle which is being stolen, but because of the ease with which a license certificate may be transferred from one vehicle to another, the maximum advantage of the system is not realized.

In view of the foregoing, I have devised the display receiver disclosed herein which, briefly stated, receives the license certificate in a manner to display same and which includes means so constructed and arranged that removal of the certificate from the receiver may be immediately detected by the authorities who look after such matters. In this manner the task of disguising a stolen motor vehicle is rendered quite difficult, whereby the theft of motor vehicles is discouraged.

Figure 1:
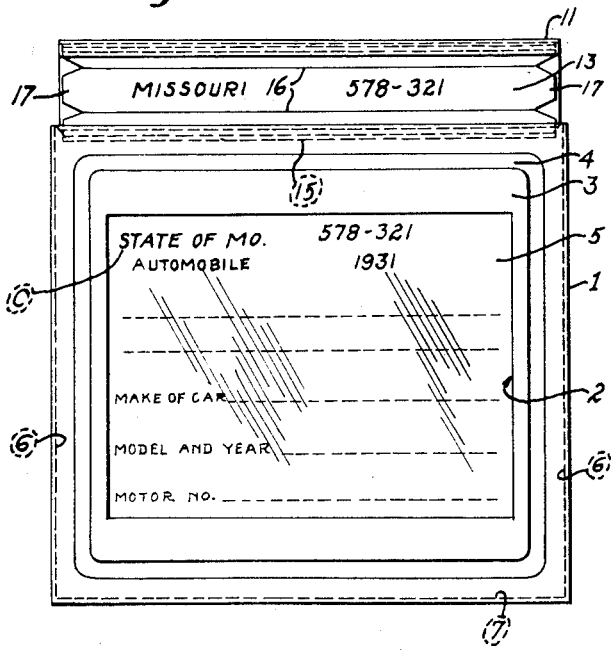
Fig. 1 is a front elevation of the improved display receiver.

In the drawing, wherein is shown for the purpose of illustration, merely, one embodiment of the invention, A designates the display receiver generally, said display receiver comprising a marginal frame 1 which is open at the back and is provided with an opening 2 at the front thereof. As shown most clearly in Figs. 2 and 3, the front wall 3 of the marginal frame 1 is bulged outwardly as indicated at 4, and such bulged portion receives a sheet of glass or other transparent material 5 which closes the opening 2.

At the opposite sides of the marginal frame 1 the material of which said marginal flange is formed is bent rearwardly and inwardly to provide guideways 6, and at the bottom of said marginal frame 1 the material thereof is bent rearwardly and upwardly to provide a like guideway 7. The guideways 6 and 7 are disposed in approximately the same vertical plane, whereby a continuous channel is provided which extends along the opposite sides and bottom of the marginal frame 1. At the top edge of the marginal frame 1 the material thereof is bent rearwardly and downwardly to provide a lip 8 which is positioned inwardly with respect to the guideways 6 and 7, so as to provide a space 9, as shown in Fig. 3, between the rear wall of the lip 8 and the plane of the rear walls of the guideways 6 at opposite sides of the marginal frame.

Arranged to move downwardly through the space 9 and with the opposite side edges thereof slidingly confined in the guideways 6 is a panel 10 which closes the rear of the marginal frame 1. The top edge of the panel 10 is provided with a rolled portion 11 which is open at its opposite edges and a space 12 is provided at the bottom of said rolled portion which permits access to the interior thereof. The license or other certificate C is interposed between the sheet of transparent material 5 and the panel 10, whereby said certificate may be viewed through said sheet of transparent material and through the front opening 2.

Figure 2:
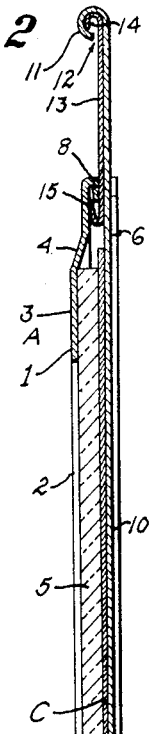
Fig. 2 is an enlarged vertical section taken through the display receiver shown in Fig. 1.
Figure 4:
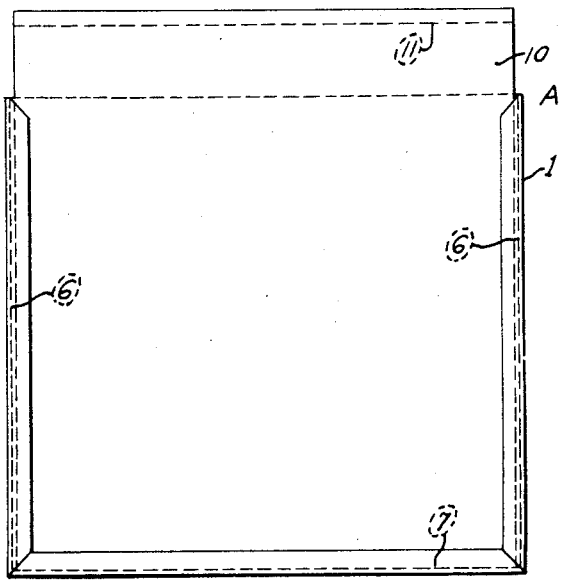
Fig. 4 is a rear elevation of the display receiver drawn to the approximate scale of Fig. 1.
Figure 3:
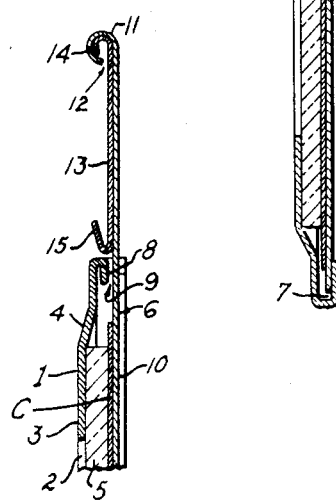
Fig. 3 is a fragmentary sectional view showing the display receiver in a partly assembled condition.

For the purpose of locking the back panel 10 in the lowered position in which same is shown in Figs. 1, 2, and 3, I provide a seal 13 which is of a length which corresponds approximately with the width of the marginal frame 1 and the back panel 10. At its top edge the seal is bent forwardly and downwardly to provide a rolled portion 14 of such dimensions that it may be inserted into the interior of the rolled portion 11 of the back panel at one side edge of said back panel and may be moved longitudinally of said rolled portion 11, the portion of the seal located below the rolled portion 14 thereof passing through the space 12. In this manner the seal is positively locked to the back panel as the rolled portion 14 of said seal is too large to pass through said space 12. At its lower edge the seal 13 is provided with an upturned lip 15 which engages the lip 8 of the marginal frame 1 in a manner to be hereinafter fully explained, so as to prevent sufficient upward movement of the back panel 10 to permit removal of the certificate C. The seal 13 is preferably made of relatively soft metal and said seal is provided with weakened lines 16 along which it may be torn, said weakened lines being extended from end to end of the seal, and the material between said weakened lines being shaped to provide tab-like end portions 17 which may be grasped when it is desired to tear the seal.

In the use of the improved display receiver, the certificate C is arranged in place therein and the back panel 10 is moved downwardly in the guideways 6 until it reaches the approximate position in which it is shown in Fig. 3. The rolled portion 14 of the seal 13 is passed longitudinally into the rolled portion 11 of the back panel from an end thereof, as already explained, the upturned lip 15 at the lower edge of the seal being located slightly above the top edge of the marginal frame 1, as shown in Fig. 3. The back panel 10 and the seal 13 are then moved downwardly, the resiliency of the material of the seal permitting the lip 13 of said seal to be forced through the space 9 and said resiliency causing said lip to expand after it has passed through said space 9, as shown in Fig. 2. When the display receiver has been assembled as described, any attempt to move the back panel 10 upwardly to permit removal of the certificate will cause the lip 15 of the seal to engage and interlock with the lip 8 of the marginal frame 1, whereby upward movement of said back panel is prevented.

When a properly authorized person desires to remove the certificate C, as when it is desired to replace it with a new certificate, he merely grasps one of the tab-like portions 17 of the seal 13 and tears said seal longitudinally along the weakened lines 16. This separates the upper and lower portions of the seal and permits ready removal of the back panel, the upper and lower portions of said seal thereafter being removed from the rolled portion of the back panel and from engagement with the lip 8 of the marginal frame, and the receiver being assembled with a new certificate in place, as already explained herein.

It is obvious, of course, that an unauthorized person may remove a certificate C by tearing the seal 13, but this will reveal to the proper authorities that the certificate receiver has been tampered with.

I claim:

1. A display receiver of the class described, comprising a body portion adapted to receive a certificate, a removable panel forming a part of said body portion, a readily destructible seal for indicating unauthorized removal of said removable panel, means for attaching said seal to said removable panel, and interengaging means on said seal and on said body portion for attaching said seal to said body portion.

2. A display receiver of the class described, comprising a body portion adapted to receive a certificate, a removable panel forming a part of said body portion, a readily destructible seal for indicating unauthorized removal of said removable panel, means for attaching said seal to said removable panel, and means on said seal and on said body portion for attaching said seal to said body portion, the last-mentioned means comprising lips adapted for interengagement with each other.

3. A display receiver of the class described, comprising a body portion adapted to receive a certificate, a removable panel forming a part of said body portion, a readily destructible seal for indicating unauthorized removal of said removable panel, means for attaching said seal to said removable panel, and means on said seal and on said body portion for attaching said seal to said body portion, the last-mentioned means comprising lips adapted for interengagement with each other, said seal being formed of material capable of being readily torn so as to permit authorized removal of said removable panel.

4. A seal for a display receiver including a body portion having a removable panel associated therewith, said seal comprising a strip of readily tearable material, means at one edge of said strip of tearable material for securing the seal to the body portion of the display receiver, and means at the opposite edge of said strip of tearable material for securing the seal to the removable panel of the display receiver.

5. A seal for a display receiver including a body portion having a removable panel associated therewith, said seal comprising a strip of material having weakened lines upon which same may be torn, means at one edge of said strip of material for securing the seal to the body portion of the display receiver, and means at the opposite edge of said strip of material for securing the seal to the removable panel of the display receiver.

6. A seal for a display receiver including a body portion having a removable panel associated therewith, said seal comprising a strip of readily tearable material, means at one edge of said strip of tearable material for securing the seal to the removable panel of the display receiver, and means comprising a lip at the opposite edge of said strip of tearable material for securing the seal to the body portion of the display receiver.

7. A seal for a display receiver including a body portion having a removable panel associated therewith, said seal comprising a strip of readily tearable material, means comprising a rolled portion at one edge of said strip of tearable material for securing the seal to the removable panel of the display receiver, and means comprising a lip at the opposite edge of said strip of tearable material for securing the seal to the body portion of the display receiver.

HARVEY G. CRAIG.